9626X
N. LOCKLIN.
Plow.
Patented Apr. 28, 1836.
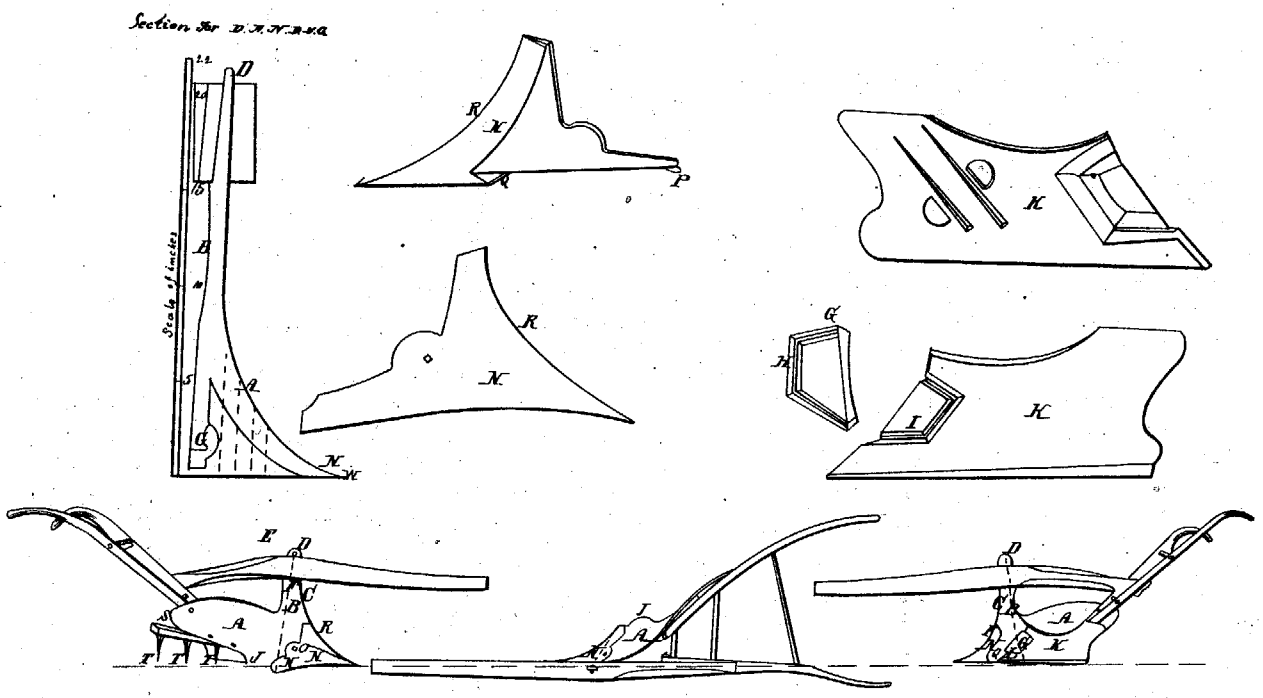
N. PETERS, PHOTO-LITHOGRAPHER, WASHINGTON, D. C.

9626X

UNITED STATES PATENT OFFICE.

NATHAN LOCKLIN, OF SPARTA, NEW YORK.

IMPROVEMENT IN PLOWS.

Specification forming part of Letters Patent dated April 28, 1836.

*To all whom it may concern:*

Be it known that I, NATHAN LOCKLIN, of Sparta, in the county of Livingston and State of New York, have invented a new and useful Improvement in Plows, called "Locking's Improved Cast-Iron Plow," which is described as follows, reference being had to the annexed drawing of the same, making part of this specification.

A represents the cast-iron mold-board, in length about two feet nine inches from the front to the hind end, and about twelve inches wide in front and ten inches wide near the center. Its fore part, B, rises in front, so as to form a part of the cutter C, as well as the sheth D, which passes through a mortise in the beam, where it is secured by a key, E, inserted into a mortise in this part of the mold-board projecting above the beam.

On the side of the mold-board is a jog, F, upon which the beam rests. On the land side of the mold-board, and forming part of it, is a short landside, G, with a double countersink-lock, H, on the inside thereof, fitting into a corresponding depression or cavity, I, cast in main landside.

The mold-board is covered in a concave manner, so as to turn the sward with the least resistance or friction, having a small curved wing, J, projecting from the lower edge of the mold-board.

The main landside K is cast separate from the mold-board, and is secured to it by the countersink of the short landsides, before mentioned, and by jogs and notches L M, cast on the mold-board. The hinder end of the landside is secured by the handle of the plow in the usual manner. The share N is likewise cast separate from the mold-board and secured to it by a screw-bolt, O, and by the jogs and notches P Q. The front of the share R forms a cutting-edge and joins on one continues the cutting-edge of the sheth, before mentioned, being about eight or ten inches in length.

The handles and beam are made in the usual manner, and the mold-board and landside may be fastened by loops or screws in the common mode. At the hinder and lower edge of the mold-board is attached, by a suitable strap of iron, S, three teeth, T, for dragging down the furrow, which can be regulated at pleasure by screws. For a further illustration of my invention I refer to the model of the same deposited in the Patent Office.

What I claim as my invention, and for which I ask a patent, consists in—

The peculiar formation of the mold-board, landside, and share, as before described, also the drag at the hind end of the mold-board.

NATHAN LOCKLIN.

Witnesses:
WM. P. ELLIOT,
B. K. MORSELL.